(12) United States Patent
Moloney et al.

(10) Patent No.: US 10,450,659 B2
(45) Date of Patent: Oct. 22, 2019

(54) CORROSION INHIBITOR COMPOSITIONS AND METHODS OF USING SAME

(71) Applicant: Ecolab USA Inc., St. Paul, MN (US)

(72) Inventors: Jeremy Moloney, Katy, TX (US); Prakasa Anantaneni, Richmond, TX (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 15/494,995

(22) Filed: Apr. 24, 2017

(65) Prior Publication Data
US 2017/0306502 A1    Oct. 26, 2017

Related U.S. Application Data

(60) Provisional application No. 62/326,963, filed on Apr. 25, 2016.

(51) Int. Cl.
| | | |
|---|---|---|
| *C23F 11/04* | (2006.01) | |
| *C09K 8/54* | (2006.01) | |
| *C23F 11/16* | (2006.01) | |
| *C23F 11/10* | (2006.01) | |

(52) U.S. Cl.
CPC ............... *C23F 11/04* (2013.01); *C09K 8/54* (2013.01); *C23F 11/10* (2013.01); *C23F 11/16* (2013.01); *C09K 2208/20* (2013.01); *C09K 2208/32* (2013.01)

(58) Field of Classification Search
CPC ...................................................... C09K 8/54
See application file for complete search history.

(56) References Cited

U.S. PATENT DOCUMENTS

| | | |
|---|---|---|
| 4,000,079 A | 12/1976 | Rasp et al. |
| 5,213,680 A | 5/1993 | Kremer et al. |
| 6,192,987 B1 | 2/2001 | Funkhouser et al. |
| 2016/0090655 A1 | 3/2016 | Pou et al. |

FOREIGN PATENT DOCUMENTS

| | | |
|---|---|---|
| CN | 105418509 A | 3/2016 |
| FR | 2761083 A1 | 9/1998 |

OTHER PUBLICATIONS

English machine translation of CN 105418509 A (Mar. 2016).*
Andreev et al., "Laboratory assessment of corrosion inhibitors effectivemenss at oilfield pipelines of West Siberian region. III. Bubble test," International Journal of Corrosion and Scale Inhibitors, 2013, vol. 2, No. 1, pp. 17-29.
Hutnan et al., "Biodegradation of Hexamethylenetetramine in Anaerobic Baffled Reactor," Polish Journal of Environmental Studies, 2005, vol. 14, No. 5, pp. 585-591.
International Search Report for International Application No. PCT/US2017/029098, dated Jun. 14, 2017, 6 pages.
Written Opinion for International Application No. PCT/US2017/029098, dated Jun. 14, 2017, 10 pages.

* cited by examiner

*Primary Examiner* — Peter F Godenschwager
(74) *Attorney, Agent, or Firm* — Kagan Binder, PLLC

(57) ABSTRACT

We disclose the use of an aliphatic tertiary amino functional compound to suppress $H_2S$ formation of a sulfur-based corrosion inhibitor during storage of the sulfur-based corrosion inhibitor in a substantially enclosed container. Thus, disclosed herein is a stabilized corrosion inhibitor composition comprising a sulfur-based corrosion inhibitor and an aliphatic tertiary amino functional compound. Also disclosed herein is a method of storing a corrosion inhibitor composition by combining a sulfur-based corrosion inhibitor and an aliphatic tertiary amino functional compound to form a stabilized corrosion inhibitor composition; and storing the stabilized corrosion inhibitor composition in a substantially enclosed container for a storage period, wherein substantially no $H_2S$ is formed within the container during the storage period.

12 Claims, 1 Drawing Sheet

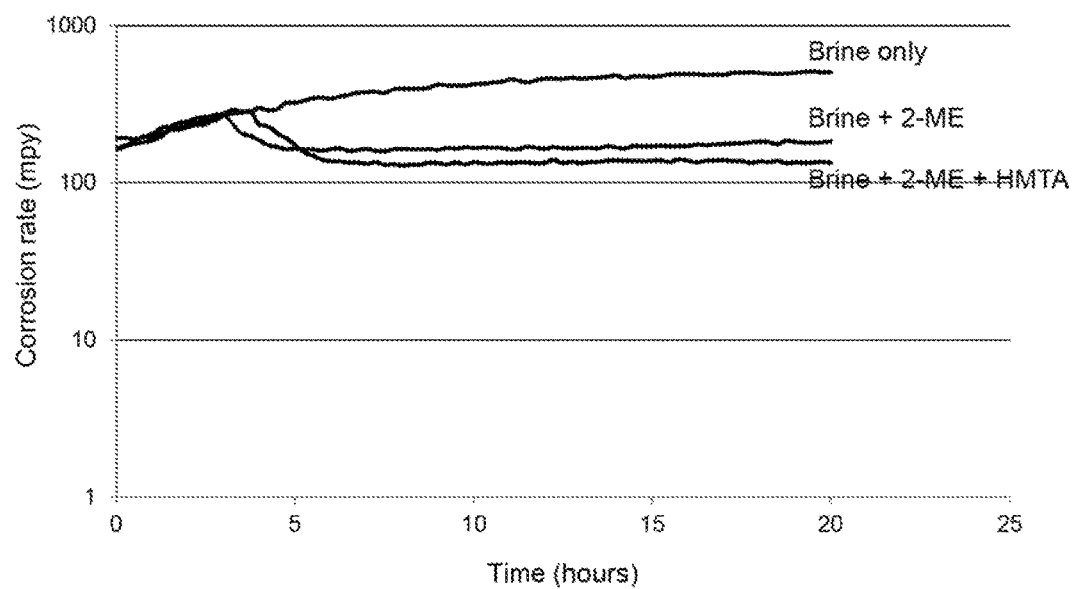

CORROSION INHIBITOR COMPOSITIONS AND METHODS OF USING SAME

FIELD OF THE INVENTION

The present invention generally relates to methods and compositions for suppressing $H_2S$ formation arising from use of sulfur-based corrosion inhibitors in water sources arising the oil and gas exploration, recovery, and processing industries. More specifically, the invention relates to methods of producing stabilized sulfur-containing corrosion inhibitor compositions by applying an amine compound to a water source further including a sulfur-based corrosion inhibitor and compositions including mixtures of amine compounds and sulfur-based corrosion inhibitors, and compositions including such mixtures in water sources comprising one or more corrodents.

BACKGROUND

Aqueous liquids are injected into the earth and/or recovered from the earth during subterranean hydrocarbon recovery processes such as hydraulic fracturing (fracking) and tertiary oil recovery. In one or more such processes, an aqueous liquid called an "injectate" is injected into a subterranean formation. Injectates include water and entrained solids and/or solvents therein. In one or more such processes a water source called "produced water" is recovered, i.e. flows back from the subterranean formation and is collected. Produced water includes one or more of injectate, connate (native water present in the subterranean formation along with the hydrocarbon), sea water, and minor (<50 wt %) amounts of hydrocarbon products, which are hydrocarbon liquids or solids entrained (dispersed, emulsified, or dissolved) in the produced water. In some embodiments, one or more of the injectate and the produced water includes "corrodents" such as salts and/or other dissolved solids, liquids, or gasses that cause, accelerate, or promote corrosion of metal containments such as metal pipelines used to transport the water sources toward, into, out of, or away from a subterranean formation, metal tanks used to hold the water sources for a period of time, and/or other metal equipment or devices that contact the water sources before, during, or after injection or production. Non-limiting examples of such corrodents are carbon dioxide, oxygen, sodium chloride, calcium chloride, and/or sulfur dioxide.

Almost all operators in the oil and gas industry employ corrosion inhibitors to reduce internal corrosion in metal containments which are contacted by aqueous liquids containing corrodents. Corrosion inhibitors are added to the liquids and dissolved gasses which come into contact with metal surfaces where they act to prevent, retard, delay, reverse, and/or otherwise inhibit the corrosion of metal surfaces such as carbon-steel metal surfaces. In some cases one or more corrosion inhibitors are added to a water source, such as an injectate and/or a produced water; optionally, other additives such as polymers, surfactants, scale inhibitors, paraffin inhibitors, metal complexing agents, and the like are added along with the corrosion inhibitor or are present in the water source to which the corrosion inhibitor is applied. Such corrosion inhibitors are beneficial in that they permit the use of carbon steel components rather than the much more expensive high nickel, cobalt, and chromium alloys or other materials either more expensive than carbon steel and/or which inherently entail other disadvantages in suitability for the purpose of liquid containment.

One useful class of corrosion inhibitors commonly employed in water sources arising from oil recovery processes are sulfur-based corrosion inhibitors (sCI). Such sCI include, for example, thioglycolic acid, mercaptoethanol, and sodium thiosulfate. sCI are known to be highly effective corrosion inhibitors and are favored in the industry because they are also inexpensive. However, some sCI are known to produce hydrogen sulfide ($H_2S$) gas when stored in an enclosed space for periods of time as short as 24 hours or even less at ambient temperatures such as about 20° C. This problem is exacerbated by storage of sCI concentrates, which have more than 1 wt % and as much as 90 wt % sCI in a solution of water, a water-miscible solvent, or a blend thereof. Conventional storage methods for sCI concentrates lead to substantial amounts of $H_2S$ gas buildup in the headspace of the containers holding such concentrates: in some embodiments, as much as 1000 ppm to 10,000 ppm $H_2S$ gas accumulates in the headspace of storage containers holding an sCI or sCI concentrate.

Hydrogen sulfide itself is a known corrodent recognized to cause severe corrosion issues in metal containments related to oil recovery operations. Hydrogen sulfide is toxic and dissolves in both hydrocarbon (oil/gasoline) and water streams. Further, where $H_2S$ is dissolved in such liquid streams it is also present as a flammable gas over the liquid streams, providing a severe health and safety risk.

The industry has recognized the hazards associated with $H_2S$ and has responded by development of $H_2S$ scavengers, which do not prevent degradation of sCI but rather adsorb or react with $H_2S$ to remove (scavenge) it from the systems where it becomes entrained. For example, triazines are known $H_2S$ scavengers. The scavenger approach is effective for eliminating naturally arising sources of $H_2S$, such as in natural gas, produced water, and the like. However, once a molecule of sCI is degraded to release $H_2S$, the residue of the degraded sCI is no longer effective as a corrosion inhibitor.

Consequently, there is a need in the industry to prevent accumulation of $H_2S$ gas during storage of sCI compounds and compositions containing sCI compounds. There is a need in the industry for stabilized sCI compositions. There is a need in the industry to improve the efficacy of corrosion inhibition compositions.

BRIEF DESCRIPTION OF THE DRAWINGS

FIG. 1 is a plot showing metal corrosion rate as a function of time during contact of the metal with a water source, with a water source containing an sCI, and with a water source containing both the sCI and an aliphatic tertiary amino functional compound.

SUMMARY OF THE INVENTION

Disclosed herein is a stabilized corrosion inhibitor composition comprising a sulfur-based corrosion inhibitor and an aliphatic tertiary amino functional compound in a weight ratio of 1000:1 to 1:1000 of the sulfur-based corrosion inhibitor to the aliphatic tertiary amino functional compound. In embodiments, the stabilized corrosion inhibitor composition of claim 1 further comprises a water or a water-miscible solvent. In embodiments, the concentration of the sulfur-based corrosion inhibitor in the composition is about 1 wt % to 90 wt %. In embodiments, the concentration of the sulfur-based corrosion inhibitor in the composition is about 5 wt % to 20 wt %. In embodiments, the sulfur-based corrosion inhibitor is mercaptoethanol, sodium thiosulfate, thioglycolic acid, or a blend of two or more thereof. In embodiments, the aliphatic tertiary amino functional compound is alicyclic, further wherein one or more of the tertiary amine moieties are part of a ring structure of the alicyclic. In embodiments, the aliphatic tertiary amino functional compound is hexamethylenetetramine. In embodiments, the weight ratio of sulfur-based corrosion inhibitor to aliphatic tertiary amino functional compound is about 100:1 to 1:1000. In embodiments, the composition further comprises one or more cosolvents, polymers, $H_2S$ scavengers, surfactants, or combinations of two or more thereof.

Also disclosed herein is a method of storing a corrosion inhibitor composition, the method comprising combining a sulfur-based corrosion inhibitor and an aliphatic tertiary amino functional compound in a weight ratio of 1000:1 to 1:1000 of the sulfur-based corrosion inhibitor to the aliphatic tertiary amino functional compound to form a stabilized corrosion inhibitor composition; and storing the stabilized corrosion inhibitor composition in a substantially enclosed container for a storage period of about 1 day to 2 years, wherein substantially no $H_2S$ is formed within the container during the storage period. In embodiments, the method comprises applying the stabilized corrosion inhibitor composition to one or more water sources contacting a metal containment. In embodiments, the water source is produced water or recycled produced water. In embodiments, the metal containment comprises carbon steel. In embodiments, the concentration of the sulfur-based corrosion inhibitor in the stabilized corrosion inhibitor composition is substantially the same before and after the storage period.

Also disclosed herein is the use of an aliphatic tertiary amino functional compound to suppress $H_2S$ formation of a sulfur-based corrosion inhibitor during storage of the sulfur-based corrosion inhibitor in a substantially enclosed container. Also disclosed herein is the use of the disclosed stabilized corrosion inhibitor composition to inhibit corrosion of a metal containment contacted with one or more water sources.

Other objects and features will be in part apparent and in part pointed out hereinafter.

DETAILED DESCRIPTION

Although the present disclosure provides references to preferred embodiments, persons skilled in the art will recognize that changes may be made in form and detail without departing from the spirit and scope of the invention. Reference to various embodiments does not limit the scope of the claims attached hereto. Additionally, any examples set forth in this specification are not intended to be limiting and merely set forth some of the many possible embodiments for the appended claims.

Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)", "include(s)", "having", "has", "can", "contain(s)", and variants thereof, as used herein, are intended to be open-ended transitional phrases, terms, or words that do not preclude the possibility of additional acts or structures. The singular forms "a", "and", and "the" include plural references unless the context clearly dictates otherwise. The present disclosure also contemplates other embodiments "comprising", "consisting of" and "consisting essentially of", the embodiments or elements presented herein, whether explicitly set forth or not.

As used herein, the term "optional" or "optionally" means that the subsequently described component, event or circumstance may but need not be present or occur. The description therefore discloses and includes instances in which the event or circumstance occurs and instances in which it does not, or instances in which the described component is present and instances in which it is not.

As used herein, the term "about" modifying, for example, the quantity of an ingredient in a composition, concentration, volume, temperature, time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, through standard operating machine error, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents according to this definition. Further, where "about" is employed to describe a range of values, for example "about 1 to 5" the recitation means "1 to 5" and "about 1 to about 5" and "1 to about 5" and "about 1 to 5" unless specifically limited by context.

As used herein, the term "substantially" means "consisting essentially of", as that term is construed in U.S. patent law, and includes "consisting of" as that term is construed in U.S. patent law. For example, a solution that is "substantially free" of a specified compound or material may be free of that compound or material, or may have a minor amount of that compound or material present, such as through unintended contamination or incomplete purification. A "minor amount" may be a trace, an unmeasurable amount, an amount that does not interfere with a value or property, or some other amount as provided in context. A composition that has "substantially only" attached to a provided list of components may consist of only those components, or have a trace amount of some other component present, or have one or more additional components that do not materially affect the properties of the composition. Additionally, "substantially" modifying, for example, the type or quantity of an ingredient in a composition, a property, a measurable quantity, a method, a value, or a range, employed in describing the embodiments of the disclosure, refers to a variation that does not affect the overall recited composition, property, quantity, method, value, or range thereof in a manner that negates an intended composition, property, quantity, method, value, or range. Where modified by the term "substantially" the claims appended hereto include equivalents according to this definition.

As used herein, the term "water source" means a liquid comprising water and one or more corrodents. In some embodiments, the water source is produced water. In some embodiments the water source is an injectate, wherein the injectate includes recycled produced water.

As used herein, the term "produced water" means water that flows back from a subterranean formation in a hydrocarbon recovery process and comprises hydrocarbon. In some embodiments, produced water includes water that flows back from a subterranean formation in a hydrocarbon recovery process, and is subsequently separated from the bulk hydrocarbon phase but comprises an amount of residual hydrocarbon. In some embodiments, the produced water is reused as a component of or as injectate, in which case it is termed "recycled produced water" herein.

As used herein, the term "injectate" means water plus any solids, liquids, and/or gasses entrained therein that is injected into a subterranean formation for the purpose of inducing hydrocarbon recovery therefrom.

As used herein, the term "sulfur-based corrosion inhibitor" or "sCI" is a compound that comprises at least one sulfur atom and is effective to inhibit corrosion of a metal surface of a containment when applied to the containment before, during, and/or after contact of a water source with the metal containment.

As used herein, "inhibit" means prevent, retard, slow, hinder, reverse, remove, delay, or combinations thereof.

As used herein, the term "container" means a vessel having means to enclose a liquid therein, wherein "enclose" means isolated from the atmosphere.

As used herein, the term "metal containment" means any object comprising a metal surface capable of undergoing corrosion when contacted by a water source, wherein the containment holds, contains, transports, guides the flow of, and/or otherwise contacts a water source.

As used herein, the term "steel" means an alloy comprising, consisting of, or consisting essentially of iron and carbon.

As used herein, the term "carbon steel" means steel in which the main alloying component is carbon, wherein the carbon steel comprises between about 0.1% to about 2.1% by weight of carbon.

As used herein, the term "aliphatic" means lacking a planar unsaturated ring of atoms that is stabilized by an interaction of the bonds forming the ring.

Discussion

It has been discovered that certain aliphatic tertiary amino functional compounds (hereinafter "amino compounds", "stabilizers", "stabilizer compound(s)" or "stabilizing compound(s)") are suitably added to sulfur-based corrosion inhibitors (sCI) to form stabilized corrosion inhibitor compositions. The stabilized corrosion inhibitor compositions are characterized by lack of hydrogen sulfide gas accumulation during storage thereof in an enclosed container. In some such embodiments, the stabilized corrosion inhibition composition inhibits $H_2S$ gas accumulation of the sCI during and/or after contact of the sCI with a water source, an oil source, or a combination thereof.

Thus, in embodiments, a stabilized corrosion inhibitor composition comprises, consists essentially of, or consists of one or more sCI compounds combined with one or more stabilizer compounds, optionally further including a solvent. In other embodiments, a method of storing an sCI comprises, consists essentially of, or consists of combining a stabilizer compound with an sCI to form a stabilized corrosion inhibitor composition; and storing the stabilized corrosion inhibitor composition in a substantially enclosed container for a storage period, wherein substantially no $H_2S$ is formed within the container during the storage period. In still other embodiments, a method of corrosion inhibition comprises, consists essentially of, or consists of combining a stabilizer compound with an sCI to form a stabilized corrosion inhibitor composition; and applying the stabilized corrosion inhibitor composition to one or more water sources contacting a metal containment, wherein the sCI does not form $H_2S$ within the metal containment. In some such embodiments, the method of corrosion inhibition further comprises storing the stabilized corrosion inhibitor composition in a container for a period of time after the combining and before the applying. In still other embodiments, the invention comprises use of a stabilizer compound to suppress $H_2S$ formation of an sCI during storage of the sCI in a container. In still other embodiments, the invention comprises the use of a stabilized corrosion inhibitor composition to inhibit corrosion of a metal containment contacted with one or more water sources. Such use includes inhibition of corrosion substantially without degradation of the sCI and concomitant $H_2S$ formation.

The sCI employed in the stabilized corrosion inhibitor compositions are any one or more of the water-soluble sulfur-functional corrosion inhibitor compounds known to suppress corrosion of metal containments contacted with a water source. Such compounds include, but are not limited to, 2-mercaptoethanol (thioglycol), thioglycolic acid (mercaptoacetic acid), methylthioglycolate, 4-mercaptophenol, 4-methoxybenzenthiol, and disodium thiosulfate (sodium thiosulfate). All of these compounds are associated with formation of $H_2S$ during storage in an enclosed container and/or after contact of the sCI with a water source. The amount of sCI applied to a water source ranges from about 10 ppm to 1000 ppm as a targeted range, although more or less are also used in some embodiments. One of skill will understand that the amount of sCI targeted for application to a water source is optimized by an operator depending on the chemical composition of both the metal containment and the water source contacting the metal containment.

The stabilizer compounds comprise, consist essentially of, or consist of aliphatic compounds including at least one tertiary amine moiety. As used herein, "tertiary amine moiety" means a nitrogen bearing moiety including no N—H bonds. Thus, in various embodiments the tertiary amine moiety is alkylamino, alkylimino (condensation products of primary amino compounds with carbonyl compounds), or nitrile. In some embodiments, the stabilizer compounds include two tertiary amine moieties. In some embodiments, the stabilizer compounds include three tertiary amine moieties. In some embodiments, the stabilizer compounds include four tertiary amine moieties. In some embodiments, the stabilizer compounds include five tertiary amine moieties. In some embodiments, the stabilizer compounds include about 5 to 1000 tertiary amine moieties, or about 10 to 1000, or about 25 to 1000, or about 50 to 1000, or about 100 to 1000, or about 250 to 1000, or about 500 to 1000, or about 5 to 500, or about 5 to 250, or about 5 to 100, or about 5 to 50, or about 5 to 20, or about 5 to 10 tertiary amine moieties. In some embodiments, all amine moieties present in the stabilizer compound are tertiary amine moieties. In some embodiments, the stabilizer compound is alicyclic, wherein one or more of the tertiary amine moieties are part of a ring structure. In some embodiments the stabilizer compound is a branched, hyperbranched, macrocyclic, or dendritic compound. In embodiments, the stabilizer compound includes only carbon, hydrogen, and nitrogen. In some embodiments the stabilizer compound includes only carbon, hydrogen, nitrogen and one or more of oxygen and sulfur. In some embodiments, the stabilizer compound includes one or more imine or nitrile groups in addition to or instead of the one or more trialkylamino moieties. In embodiments the molecular weight of the stabilizer compound is between 100 g/mol and 25,000 g/mol. Where the stabilizer compound is oligomeric or polymeric as described herein, molecular weight recitation means weight average molecular weight.

In some embodiments the stabilizer compound comprises, consists essentially of, or consists of N,N,N',N'-tetrapropylbutane-1,4-diamine, 3-dimethylaminopropanol, 3-dimethylaminopropylamine, bis-(dimethylaminopropyl)amine, N,N-dimethylethanolamine, tetramethylethylenediamine, tetraethylethylenediamine, t-butoxy bis(dimethylamino) methane, 3-(dimethylamino)propionitrile, hexamethylenetetramine (hereinafter "HMTA"; 1,3,5,7-tetraazaadamantane) which has the structure

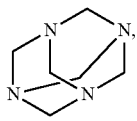

or a blend of two or more thereof.

Structures related to HMTA that are also usefully employed as stabilizer compounds include oligomers that are the reaction product of HMTA with phenol and are dispersible or soluble in water. In some embodiments, the oligomers include dimers, trimers, and other low molecular weight adducts of HMTA and phenol having a weight-average molecular weight of about 10,000 g/mol or less, such as about 500 to 10,000 g/mol, or about 500 g/mol to 5000 g/mol, or about 500 g/mol to 2000 g/mol. Other structures related to HMTA that are usefully employed as stabilizer compounds also include partially quaternized HTMA wherein one, two, or three of the tertiary amino moieties are quaternized by reaction with e.g. an alkyl halide having one to six carbon atoms, such as methyl chloride, ethyl chloride, n-propyl chloride, isopropyl chloride, n-butyl chloride, n-pentyl chloride, n-hexyl chloride, and branched or cyclic isomers thereof.

In some embodiments, the stabilized corrosion inhibitor composition includes HMTA plus one or more equilibrium products thereof. HMTA is synthesized by reacting ammonia ($NH_3$) with formaldehyde ($H_2C=O$). In some systems, HMTA may exist in equilibrium with ammonia and formaldehyde, termed "equilibrium products" as used herein. For example, where HMTA is added to an aqueous stabilized corrosion inhibitor composition having pH of less than about 7, a measurable amount or even a substantial amount of equilibrium products may form. See, e.g. Hutnan, M. et al., *Polish Journal of Environmental Studies* 14(5), 2005, 585-591. In some embodiments, depending on factors such as pH, equilibrium may shift significantly such that the HMTA is present substantially as ammonia and formaldehyde. In other embodiments, HMTA, ammonia, and formaldehyde are all present in a stabilized corrosion inhibitor composition. In still other embodiments, HMTA is present substantially as 1,3,5,7-tetraazaadamantane itself. In any of the foregoing, HMTA, ammonia, and formaldehyde individually or in any combination thereof are effective to form a stabilized corrosion inhibitor composition as recited herein.

Further, when combined with a sulfur-based corrosion inhibitor, it is possible that one or more equilibrium products also undergo one or more reactions with the sulfur-based corrosion inhibitor to form one or more "reaction products". Thus, in embodiments, the sulfur-based corrosion inhibitor reacts with one or more molar equivalents of formaldehyde to form one or more reaction products. In embodiments the sulfur-based corrosion inhibitor reacts with one or more molar equivalents of ammonia to form one or more reaction products. In embodiments the sulfur-based corrosion inhibitor reacts with one or more molar equivalents of formaldehyde and one or more molar equivalents of ammonia, either contemporaneously or serially in any order, to form one or more reaction products. In any of the foregoing, HMTA, ammonia, formaldehyde individually or combined, or combined with any reaction product are effective as a stabilized corrosion inhibitor composition.

In some embodiments the stabilizer compound is a polyethyleneimine. In such embodiments, at least 20 mol % of the nitrogen atoms present in the polyethyleneimine are present as tertiary amine moieties. In some embodiments about 20 mol % to 100 mol % of the nitrogen present in the polyethyleneimine are present as tertiary amine moieties, for example about 20 mol % to 90 mol %, or about 20 mol % to 70 mol %, or about 20 mol % to 50 mol % of the nitrogen atoms present in the polyethyleneimine are present as tertiary amine moieties. In some embodiments the weight average molecular weight ($M_w$) of the polyethylene imine is about 500 g/mol to 25,000 g/mol, or about 1000 g/mol to 25,000 g/mol, or about 2000 g/mol to 25,000 g/mol, or about 2000 g/mol to 20,000 g/mol, or about 2000 g/mol to 15,000 g/mol, or about 1000 g/mol to 10,000 g/mol, or about 1000 g/mol to 5,000 g/mol.

In embodiments, the sCI is combined with a stabilizer compound in a selected ratio to form a stabilized corrosion inhibitor composition, wherein the ratio of sCI to stabilizer compound is determined; and the stabilized corrosion inhibitor composition is then applied to a water source in an amount targeted for effective corrosion inhibition based on the amount of sCI applied. In other embodiments, the sCI and the stabilizer compound are combined substantially contemporaneously with the application thereof to the water source. Thus, for example, in some embodiments the stabilizer compound is simply added to an otherwise already blended product. In other embodiments, the stabilizer compound is first mixed with the sCI in a solvent, such as water, before subsequent addition of this initial mixture to the other components to make a stabilized corrosion inhibitor composition.

In embodiments, the ratio of sCI to stabilizer compound in the stabilized corrosion inhibitor compositions is about 1000:1 to 1:1000 by weight, for example about 1000:1 to 1:1 by weight, or about 500:1 to 1:1 by weight, or about 200:1 to 1:1 by weight, or about 100:1 by weight to 1:1 by weight, or about 80:1 by weight to 1:1 by weight, or about 60:1 by weight to 1:1 by weight, or about 40:1 by weight to 1:1 by weight, or about 20:1 by weight to 1:1 by weight, or about 10:1 by weight to 1:1 by weight, or about 500:1 to 2:1 by weight, or about 500:1 to 10:1 by weight, or about 500:1 to 20:1 by weight, or about 500:1 to 100:1 by weight, 1:1 to 1000:1 by weight, or about 1:1 to 1:500 by weight, or about 1:1 to 1:200 by weight, or about 1:1 by weight to 1:100 by weight, or about 1:1 by weight to 1:80 by weight, or about 1:1 by weight to 1:60 by weight, or about 1:1 by weight to 1:40 by weight, or about 1:1 by weight to 1:20 by weight, or about 1:1 by weight to 1:10 by weight, or about 1:1 to 1:5 by weight, or about 1:1 to 1:4 by weight, or about 1:1 to 1:3 by weight, or about 1:1 to 1:2 by weight, or about 500:1 to 1:500 by weight, or about 100:1 to 1:100 by weight, or about 100:1 to 1:10 by weight, or about 100:1 to 1:5 by weight. In some embodiments the stabilized corrosion inhibitor compositions are combined in a container for storage purposes. In such embodiments, the container is enclosed and comprises a headspace. The stabilized corrosion inhibitor compositions within an enclosed container are characterized by substantial lack of $H_2S$ formation or substantial lack of $H_2S$ accumulation within the headspace.

In some embodiments, the stabilizer compound is also a corrosion inhibitor. For example, in one non-limiting embodiment, in U.S. Pat. No. 5,213,680 HMTA is disclosed to be a corrosion inhibitor in oil bearing equipment used e.g. to transport and store crude petroleum oil. Thus, in an embodiment where HMTA is employed as the stabilizer compound for an sCI, any stabilizer compound present in the stabilized corrosion inhibitor compositions at the time the composition is applied to a water source also inhibits corrosion of a metal containment contacted with the applied stabilized corrosion inhibitor composition.

In some embodiments the stabilized corrosion inhibitor compositions are stored in the enclosed container as concentrates, that is, as solutions or dispersions in a polar solvent. In some embodiments the solvent comprises, consists essentially of, or consists of water. In other embodiments the solvent is a non-aqueous polar solvent. In still other embodiments the solvent is a water miscible solvent. Such concentrated stabilized corrosion inhibitor compositions are termed "stabilized concentrates" in some embodiments. The stabilized concentrates comprise at least about 1 wt % sCI and up to about 90 wt % sCI, for example about 1 wt % to 80 wt %, or about 1 wt % to 70 wt %, or about 1 wt % to 60 wt %, or about 1 wt % to 50 wt %, or about 1 wt % to 40 wt %, or about 1 wt % to 30 wt %, or about 1 wt % to 20 wt %, or about 1 wt % to 10 wt %, or about 3 wt % to 90 wt %, or about 5 wt % to 90 wt %, or about 10 wt % to 90 wt %, or about 15 wt % to 90 wt %, or about 20 wt % to 90 wt %, or about 25 wt % to 90 wt %, or about 30 wt % to 90 wt %, or about 3 wt % to 30 wt %, or about 3 wt % to 20 wt %, or about 5 wt % to 25 wt %, or about 5 wt % to 15 wt % sCI by weight of the stabilized concentrate.

In embodiments, the stabilized concentrates include one or more additives. The additives are non-corrosion inhibiting compounds added to the stabilized concentrates to provide an advantageous effect. The advantageous effects include compatibilization of solution components; stabilization of the solution from e.g. precipitation; pH adjustment; $H_2S$ scavengers to scavenge $H_2S$ present naturally in or arising from the water source; and ease and completeness of mixing when the stabilized concentrate is applied to a water source. Exemplary additives include, but are not limited to, water miscible solvents such as methanol, ethanol, or another $C_1$-$C_6$ alkanol, alkoxyalkanols, glycols, and the like; alicyclic, aromatic, or aralkyl amines having 6 to 30 carbons, and including e.g. triazine, pyridine and substituted pyridines; aliphatic and alicyclic amides; imidazoline; quaternary ammonium surfactants having an HLB greater than about 9; phosphate esters such as $C_2$-$C_{16}$ or $C_8$-$C_{10}$ alkyl phosphate esters including e.g. di-2-ethylhexyl phosphate (di-2-ethylhexyl phosphoric acid), dinonylphosphate, didecylphosphate, mixed phosphate esters, and the like, ethoxylated $C_1$-$C_{12}$ or $C_8$-$C_{10}$ alkylphenol phosphate esters, or other organophosphate esters having a total of 2 to 30 carbons; quinoline, salts thereof, and quaternized derivatives thereof with $C_1$-$C_{30}$ alkyl halides; water soluble polymers such as polyethylene oxide and copolymers thereof; derivatives of carboxylic acids having 6 to 30 carbons, such as salts or alkanol esters of $C_1$-$C_{30}$ organic acids; and mono- or polyunsaturated long-chain acids derived from sources comprising, consisting essentially of, or consisting of tall oil (tall oil fatty acids, or TOFA), coconut oil, canola oil, palm seed oil, and the like obtained as a by-product of the Kraft process of wood pulp manufacture, principally from pulping coniferous trees. The majority component of TOFA (i.e. after purification of crude tall oil) is oleic acid. Blends of two or more of any of the foregoing are anticipated as suitably included in the stabilized concentrates of the invention.

The stabilized concentrates are suitably stored within enclosed containers at temperatures of about 0° C. to 60° C., or about 10° C. to 50° C., or about 20° C. to 30° C. for a storage period of about 1 day to 2 years, for example about 1 week to 2 years, or about 1 month to 2 years, or about 6 months to 2 years, or about 1 year to 2 years, or about 1 month to 1 year. During the storage, no special steps or treatments are required to stabilize or mitigate degradation within the stabilized concentrates. Containers useful for storing the stabilized concentrates are substantially enclosed: that is, the container is substantially isolated from the atmosphere. Substantial isolation means that the container is isolated from the atmosphere during the storage period but may be periodically and temporarily opened during the storage period, for example to remove an aliquot of the composition for application to a water source within a metal containment. It is a feature of the stabilized concentrates of the invention that no $H_2S$ is detectible in the headspace of such containers during the storage period, when the detection is carried out using common quantitative techniques such as gas chromatography employing DRAEGER-TUBES® or GASTEC® tubes for headspace measurements. The enclosed containers containing the stabilized concentrates are suitably opened periodically and temporarily throughout the storage period, wherein no $H_2S$ is detected within the container, e.g. in the headspace above the stabilized concentrate during any one or more such openings. Thus, the enclosed storage containers may be defined as "substantially enclosed containers" wherein "substantially" here indicates that the containers containing the stabilized concentrates are enclosed during the storage period but are suitably opened periodically and temporarily throughout the storage period.

This feature of the invention is highly advantageous, since as a result of the stabilization of the sCI no pressure develops in the enclosed containers due to accumulation of $H_2S$ gas; a user opening the enclosed container after a period of storage is not exposed to toxic $H_2S$ gas; and the sCI is not degraded during the storage. Degradation of sCI leads to loss of active corrosion inhibitor from concentrates thereof; thus, after a period of storage, the stabilized concentrates include a higher concentration of sCI than a similar concentrate having no stabilizer compound included therein. In some embodiments, after a period of storage, the stabilized concentrates include substantially the same concentration of sCI as the concentration of sCI initially added to form the stabilized concentrate.

The container used to enclose the stabilized concentrate is not particularly limited in terms of materials, shape, or size and is selected by the user for convenience of storing the container during a storage period. In various embodiments the stabilized concentrates are stored within a container comprising one or more materials that are stable to aqueous solutions; such materials include but are not limited to glass, a polyamide, a metal, polyethylene terephthalate (PET), a polystyrene, an acrylonitrile-butadiene-styrene (ABS) terpolymer, or a polyolefin such as polyethylene, polypropylene, and copolymers thereof including copolymers with α-olefins such as octene and hexene. The container is suitably in the form of bottles, jars, carboys, tanks, drums, and the like. The containers generally include means to periodically and temporarily open the otherwise enclosed container comprising a stabilized corrosion inhibitor composition of the invention; such means include but are not limited to screw caps, valves, snap caps, fitted corks, fitted lids secured by pressure from e.g. clamps, clips, brackets; and the like.

Thus, in embodiments, a stabilized corrosion inhibitor composition comprises, consists essentially of, or consists of an sCI combined with a stabilizer compound. In some embodiments the stabilized corrosion inhibitor composition is a stabilized concentrate. The stabilized corrosion inhibitor composition is stable for a storage period of about 1 day to 2 years at a temperature of about 0° C. to 60° C. as described above, wherein "stable" means that no measurable $H_2S$ is evolved from the stabilized corrosion inhibitor composition during the storage period. In some embodiments, "stable" means that no measurable $H_2S$ is evolved during the storage period and the sCI does not substantially degrade or react to form a compound that is not a corrosion inhibitor. In some such embodiments, a stabilized corrosion inhibitor composition subjected to the storage period comprises substantially the same concentration of sCI as the amount of sCI added to the stabilized corrosion inhibitor composition.

In embodiments, a method of storing an sCI comprises, consists essentially of, or consists of combining a stabilizer compound with an sCI to form a stabilized corrosion inhibitor composition; and storing the stabilized corrosion inhibitor composition in an enclosed container for a period of time, wherein substantially no $H_2S$ is formed within the enclosed container. In some such embodiments, no $H_2S$ is detectable within the headspace of the enclosed container. As used herein, "headspace" means the space within the enclosed container that is unoccupied by the stabilized corrosion inhibitor composition. In some embodiments, the headspace comprises air.

In embodiments, a method of corrosion inhibition comprises, consists essentially of, or consists of combining a stabilizer compound to an sCI to form a stabilized corrosion inhibitor composition; and applying the stabilized corrosion inhibitor composition to one or more water sources contacting a metal containment, wherein the sCI does not form $H_2S$ within the metal containment. In some embodiments the stabilized corrosion inhibitor composition is a stabilized concentrate. In some embodiments, the applying comprises, consists essentially of, or consists of dripping, pouring, spraying, pumping, injecting, or otherwise adding an amount of the stabilized corrosion inhibitor composition to the metal containment, or to a water source that subsequently contacts the metal containment. In some embodiments, the applying is batchwise; in other embodiments the applying is continuous. In some embodiments, the method of corrosion inhibition further comprises storing the stabilized corrosion inhibitor composition in a container for a storage period after the combining and before the applying. In such embodiments, the stabilized corrosion inhibitor composition after the storage period is characterized by a lack of $H_2S$ present in the headspace of the container.

In embodiments, a stabilizer compound is used to suppress $H_2S$ formation of an sCI during storage of the sCI in a container. In still other embodiments, a stabilized corrosion inhibitor composition is used to inhibit corrosion of a metal containment contacted with one or more water sources, one or more oil sources, or a combination thereof.

It is an advantage of the stabilized corrosion inhibitor compositions that the stabilizer compounds also function as corrosion inhibitor compounds in some embodiments; that is, the aliphatic tertiary amine compounds such as HMTA are known to be corrosion inhibitors in petroleum oil sources, and in some embodiments function as corrosion inhibitors when the stabilized corrosion inhibitor composition are applied to an oil source or a water source. The stabilizer compound's dual functionality first as stabilizer when combined with the sCI, and second as a corrosion inhibitor when combined with an oil source or a water source, means that any excess stabilizer compound applied to the stabilized compositions (wherein here, "excess" means the amount of stabilizer compound present in the stabilized compositions that does not scavenge $H_2S$ or prevent formation thereof) does not give rise to any waste when the stabilized compositions are applied to a water source or an oil source. Rather, excess stabilizer compound, and possibly one or more reaction products of the stabilizer compound present in the stabilized composition, is usefully employed in the inhibiting corrosion of one or more metal surfaces during or after contact with a water source, an oil source, or a combination thereof.

In general, the concept of stabilizing sulfur-containing species with aliphatic tertiary amine compounds is applicable to the use of any sulfur-containing species wherein evolution of $H_2S$ as a degradation product thereof may occur. Besides sulfur-containing corrosion inhibitors, some examples of commercially significant sulfur-containing compounds include sulfur-containing species used industrially as scale inhibitors, foamers, asphaltene inhibitors, paraffin inhibitors, hydrate inhibitors, biocides, or other industrial water treatment compounds. Compositions containing such compounds are suitably stabilized by addition of one or more aliphatic tertiary amine compounds, for example HMTA. Suitably stabilized compositions include, for example, SCORTRON® GR-221 scale inhibitor/corrosion inhibitor combination product (available from Nalco Champion of Naperville, Ill.) which contains about 1.4% thioglycolic acid; and similar foaming compositions including thioglycolic acid at levels of about 1 wt % to 3 wt % based on composition weight. Such compositions will benefit, in embodiments, by addition of about 0.5 wt % or less of HMTA or another aliphatic tertiary amine compound.

Non-limiting examples of applying a stabilized corrosion inhibitor composition to a metal containment include introducing the stabilized corrosion inhibitor composition to a tank comprising metal, wherein at least a part of the stabilized corrosion inhibitor is in contact with at least part of the metal; introducing a stabilized corrosion inhibitor composition to a pipe comprising metal, wherein the stabilized corrosion inhibitor composition flows in the pipe or sits in the pipe, and wherein at least part of the stabilized corrosion inhibitor composition is in contact with at least part of the metal; or introducing the stabilized corrosion inhibitor composition into a device comprising metal, wherein at least part of the stabilized corrosion inhibitor composition is in contact with at least part of the metal. Non limiting examples of "introducing a corrosion inhibitor composition to" include pouring, pumping, spraying, or dropping a corrosion inhibitor composition into, onto, through, underneath, at the aside of, or around. In some embodiments, corrodents present in a water source react with a metal containment contacted by the water source. In some embodiments, a first corrodent accelerates or catalyzes the reaction of a second corrodent with metal.

In embodiments, the water source is selected from the group consisting of produced water, injectate, effluent from mining, and effluent from paper production. In embodiments, the water source is a high total dissolved solids water source; a high temperature water source; or a high total dissolved solids, high temperature water source. As used herein, "high temperature" means temperature in excess of about 60° C. and as high as about 200° C. As used herein, "high total dissolved solids" means about 5 wt % or more non-polymeric solids are dissolved in the water source. In some embodiments where the water source includes high total dissolved solids, a substantial portion of the total dissolved solids are ionic compounds. High total dissolved solids water sources include about 5 wt % to 35 wt %, or about 5 wt % to 32 wt %, or about 5 wt % to 30 wt %, or about 5 wt % to 28 wt %, or about 5 wt % to 26 wt %, or about 5 wt % to 24 wt %, or about 5 wt % to 22 wt %, or about 5 wt % to 20 wt %, or about 6 wt % to 35 wt %, or about 7 wt % to 35 wt %, or about 8 wt % to 35 wt %, or about 9 wt % to 35 wt %, or about 10 wt % to 35 wt %, or about 12 wt % to 35 wt %, or about 14 wt % to 35 wt %, or about 16 wt % to 35 wt %, or about 18 wt % to 35 wt %, or about 20 wt % to 35 wt %, or about 22 wt % to 35 wt %, or about 25 wt % to 35 wt %, or about 10 wt % to 32 wt %, or about 10 wt % to 30 wt %, or about 10 wt % to 28 wt %, or about 10 wt % to 26 wt %, or about 10 wt % to 24 wt %, or about 10 wt % to 22 wt %, or about 10 wt % to 20 wt % non-polymeric solids. In some embodiments, the non-polymeric solids are corrodents. In some embodiments, the non-polymeric solids comprise corrodents. In some embodiments, the water source is produced water, brackish water, or sea water.

In some embodiments, the water source comprises, consists essentially of, or consists of produced water, injectate, seawater, municipal water, wastewater such as runoff water, "gray" water, municipal waste water, treated or partially treated waste water, brackish water, sea water, connate, groundwater, wastewater discharge from a pulp or paper mill, waste from mining such as "tailings", red mud from aluminum mining and processing, yellow boy, acid mine drainage, or a combination of two or more such water sources as determined by context. In some embodiments, the water source comprises 85000 ppm Cl or more. In some embodiments, the water source comprises from 300 to 18000 ppm by weight of Cl. In some embodiments, the water source comprises between 10000 and 100000 ppm of Cl. In some embodiments, the water source comprises between 50000 and 200000 ppm based on weight.

The water source comprises, consists of, or consists essentially of water and one or more corrodents. In some embodiments, the water source comprises, consists of, or consists essentially of an aqueous solution of a metal chloride. In some embodiments, the water source comprises, consists of, or consists essentially of aqueous sodium chloride. In some embodiments, the water source comprises aqueous metal ions. In some embodiments, the water source comprises aqueous anions. In some embodiments, the water source comprises aqueous hydrogen ions wherein the pH of the water source is less than 7.

In some embodiments, the water source comprises water and one or more corrodents, wherein the one or more corrodents comprises, consists essentially of, or consists of metal cations, metal complexes such as aqueous metal cations, metal chelates and/or organometallic complexes, aluminum ions, ammonium ions, barium ions, chromium ions, cobalt ions, cuprous ions, cupric ions, calcium ions, ferrous ions, ferric ions, hydrogen ions, magnesium ions, manganese ions, molybdenum ions, nickel ions, potassium ions, sodium ions, strontium ions, titanium ions, uranium ions, vanadium ions, zinc ions, bromide ions, carbonate ions, chlorate ions, chloride ions, chlorite ions, dithionate ions, fluoride ions, hypochlorite ions, iodide ions, nitrate ions, nitrite ions, oxide ions, perchlorate ions, peroxide ions, phosphate ions, phosphite ions, sulfate ions, sulfide ions, sulfite ions, hydrogen carbonate ions, hydrogen phosphate ions, hydrogen phosphite ions, hydrogen sulfate ions, hydrogen sulfite ions, carbonic acid, hydrochloric acid, nitric acid, sulfuric acid, nitrous acid, sulfurous acid, peroxy acids, phosphoric acid, ammonia, bromine, carbon dioxide, chlorine, chlorine dioxide, fluorine, hydrogen chloride, hydrogen sulfide, iodine, nitrogen dioxide, nitrogen monoxide, oxygen, ozone, sulfur dioxide, hydrogen peroxide, polysaccharide, or combinations thereof.

In some embodiments, the one or more corrodents comprises, consists of, or consists essentially of insoluble particulates such as metal oxides, sands, clays, silicon dioxide, titanium dioxide, muds, and other insoluble inorganic and/or organic particulates, which in some embodiments act as abrasives when entrained in a water flow contacting a metal.

In some embodiments, the one or more corrodents comprises, consists of, or consists essentially of an oxidizing agent. In some embodiments, the corrodent comprises, consists of, or consists essentially of a chelating agent. In some embodiments, the corrodent comprises an alcohol. In some embodiments, the corrodent comprises an organochlorine compound. In some embodiments, the one or more corrodents comprises, consists of, or consists essentially of an acid. In some embodiments, the one or more corrodents comprises, consists of, or consists essentially of an alkali. In some embodiments, the pH of the water source is less than 7. In some embodiments, the pH of the water source is between about 1 and about 6. In some embodiments, the pH of the water source is between 5 and 6. In some embodiments, the pH of the water source is between 4 and 5. In some embodiments, the pH of the water source is between 3 and 4. In some embodiments, the pH of the water source is between 2 and 3. In some embodiments, the pH of the water source is between 1 and 2. In some embodiments, the pH of the water source is between 0 and 1. In some embodiments, the pH of the water source is between 7 and 14. In some embodiments, the pH of the water source is between 8 and 14. In some embodiments, the pH of the water source is between 9 and 14. In some embodiments, the pH of the water source is between 10 and 14. In some embodiments, the pH of the water source is between 11 and 14. In some embodiments, the pH of the water source is between 12 and 14. In some embodiments, the pH of the water source is between 13 and 14. In some embodiments, the pH of the water source is between 7 and 8. In some embodiments, the pH of the water source is between 7 and 9. In some embodiments, the pH of the water source is between 7 and 10. In some embodiments, the pH of the water source is between 7 and 11. In some embodiments, the pH of the water source is between 7 and 12. In some embodiments, the pH of the water source is between 7 and 13. In some embodiments, the pH of the water source is between 8 and 13. In some embodiments, the pH of the water source is between 9 and 12. In some embodiments, the pH of the water source is between 10 and 11.

In some embodiments, the water source comprises, consists essentially of, or consists of produced water; injectate; connate; industrial wastewater; an aqueous mixture comprising sodium hydroxide and sodium sulfide ("white liquor"); an aqueous mixture comprising lignin, one or more carbohydrates, sodium carbonate, sodium sulfate, and/or one or more other salts ("black liquor"); municipal waste water, treated or partially treated waste water; sea water; or a combination of two or more such water sources as determined by context. In some embodiments, the water source includes one or more salts, ions, buffers, acids, bases, surfactants, or other dissolved, dispersed, or emulsified compounds, materials, components, or combinations thereof. In some embodiments, a water source includes about 0 wt % to 35 wt % total dissolved solids. In some such embodiments, the total dissolved solids are substantially non-polymeric solids. In some such embodiments, the dissolved solids comprise, consist of, or consist essentially of ionic compounds. In some embodiments, the water source to which the corrosion inhibitor is applied to produce the corrosion inhibitor composition is sea water, brackish water, produced water, one or more additional water sources, or combinations thereof. In some such embodiments, the additional water source includes 300 ppm or more of one or more ions. In some embodiments, the water source for the corrosion inhibitor composition contains one more of the following: about 300 ppm or more of Ca, for example 500 ppm or more or even 3000 ppm or more of Ca; about 1100 ppm or more of Mg; about 300 ppm or more of Ba, for example about 500 ppm or more of Ba.

In some embodiments, the water source comprises, consists of, or consists essentially of brackish water. In some embodiments, the water source comprises, consists of, or consists essentially of seawater. In some embodiments, the water source comprises, consists of, or consists essentially of produced water. In some embodiments, the water source comprises 100 to 20000 ppm of Cl, based on weight. In some embodiments, the water source comprises 20000 to 25000 ppm of Cl, based on weight. In some embodiments, the water source comprises 10000 to 100000 ppm of Cl, based on weight. In some embodiments, the water source comprises 25000 to 200000 ppm of Cl, based on weight. In embodiments, the Cl is present as chloride ions. Useful water sources for the invention comprise, consist of, or consist essentially of produced water, injectate, or mixtures thereof.

In embodiments, the water source optionally includes one or more salts, polymers, surfactants, scale inhibitors, stabilizers, metal chelating agents, corrosion inhibitors, paraffin inhibitors, and other additives as determined by the operator in a subterranean hydrocarbon recovery process. In some embodiments, the water source comprises, consists of, or consists essentially of injectate, connate, produced water, sea water, brackish water, or brine. In some embodiments, an injectate comprises one or more of connate, produced water, sea water, brackish water, or brine. In embodiments where an injectate comprises produced water, the injectate is also termed "recycled produced water." In some embodiments, the water source further comprises minor (<50 wt %) amounts of residual hydrocarbon products entrained therein and additionally. In some embodiments, produced water additionally comprises one or more surfactants, solvents, coupling agents, emulsifying agents (emulsifiers), demulsifying agents (demulsifiers), paraffin wax inhibitors, and mixtures of two or more thereof. Produced water ranges in temperature from about −30° C. to about 200° C., depending on the subterranean source and the terranean environment and infrastructure proximal to the subterranean source.

During conveyance of a water source containing one or more corrodents, the water source contacts a metal containment. Contacting the metal containment with the water source containing one or more corrodents promotes corrosion of the metal containment. In embodiments, the metal containment is a pipe. In some such embodiments, the pipe is part of a pipeline used to convey produced water. In embodiments, the metal containment is a tank. In some such embodiments, the tank is used to store produced water. In some embodiments, the tank is part of a vehicle such as a railroad tank car or a tanker truck. At any point in the storage, conveyance, treatment, discharge, disposal, or any other process in which a water source is contacted with a metal containment, the stabilized corrosion inhibitor composition is advantageously applied to the water source to inhibit corrosion therein, further wherein the amount of sCI in the stabilized corrosion inhibitor composition applied to the water source is substantially the same as the amount of sCI added to the stabilized corrosion inhibitor composition.

The metal containment is any type of containment for liquid, vapor, gas, or solid, the containment comprising one or more metal surfaces for contacting a water source containing one or more corrodents ("contact surface"). In some embodiments, the metal containment or a contact surface thereof comprises, consists of, or consists essentially of steel. In some embodiments, the steel comprises, consists of, or consists essentially of carbon steel. In some embodiments, the metal containment or a contact surface thereof comprises, consists of, or consists essentially of iron. In some embodiments, the metal containment or a contact surface thereof comprises or consists essentially of aluminum, zinc, chromium, manganese, nickel, tungsten, molybdenum, titanium, vanadium, cobalt, niobium, copper, or mixtures thereof.

In some embodiments, the metal containment or a contact surface thereof comprises or consists essentially of metal and one or more of boron, phosphorus, sulfur, silicon, oxygen, nitrogen, and/or mixtures thereof. In some embodiments, the metal containment comprises, consists of, or consists essentially of a pipe. In some embodiments, the pipe is coiled tubing. In some embodiments, the pipe has a device attached thereto, the device or a contact surface thereof comprising, consisting of, or consisting essentially of metal. In some embodiments the device is a pressure gauge, a flowmeter, a chemical sensor, or a pump. In some embodiments, the metal containment comprises, consists of, or consists essentially of a tank. In some embodiments, the tank is a sealed tank: sealed means that the contents of the tank are not open to the atmosphere. In some embodiments, the contents of the sealed tank are at a pressure that is higher than the ambient environmental air pressure. In some embodiments, the contents of the sealed tank are at a pressure that is lower than the ambient environmental air pressure external to the tank. In some embodiments, the tank is open to the air and the contents are at ambient environmental air pressure. In some embodiments, the tank has an inflow and/or an outflow pipe attached thereto. In some embodiments, the tank has a device attached thereto. In some embodiments the device is a pressure gauge. In some embodiments the device is a flowmeter. In some embodiments the device is a chemical sensor. In some embodiments, the device is a pump. In some embodiments, the metal containment or a contact surface thereof is a device. In some embodiments the device is a pressure gauge. In some embodiments the device is a flowmeter. In some embodiments the device is a chemical sensor. In some embodiments, the device is a metal drill pipe. In some embodiments, the device is a pump. In some embodiments, the metal containment is a railroad tank car, also known as an "oil can" rail car. In some embodiments, the metal containment is a tank truck, sometimes known as a tanker.

Steel is an alloy comprising, consisting of, or consisting essentially of iron and carbon. Typically, the carbon content of steel is between 0.002% and 2.1% by weight. In some embodiments, the steel comprises between about 0.002% and 2.1% of carbon by weight. In some embodiments, the steel additionally comprises manganese, chromium, nickel, tungsten, molybdenum, boron, titanium, vanadium, cobalt, niobium, phosphorus, sulfur, silicon, oxygen, nitrogen, or copper, or mixtures thereof. In some embodiments, the steel comprises iron sulfide, ferrous oxide (iron (II) oxide), ferric oxide (iron (III) oxide), iron (II,III) oxide, hydrated iron oxides such as $Fe_2O_3 \cdot nH_2O$ where n is a number between 0.1 and 3, $Fe(OH)_3$, and/or $FeO(OH)$. In some embodiments, the steel is pre-corroded and contains, comprises, or has a surface coating comprising rust, oxide, hydroxide, oxide-hydroxide, sulfide, chloride, sulfate, nitrate, carbonate, sulfite, nitrite, phosphate, or mixtures thereof.

Carbon steel is steel in which the main alloying component is carbon, wherein the carbon steel comprises between about 0.1% to about 2.1% by weight of carbon. In one embodiment, the carbon steel comprises between 0.1% and 2.1% by weight of carbon. In one embodiment, the carbon steel comprises between 0.1% and 2.0% by weight of carbon. In one embodiment, the carbon steel comprises between 0.12% and 2.0% by weight of carbon. In one embodiment, the carbon steel comprises between 0.15% and 2.0% by weight of carbon. In one embodiment, the carbon steel comprises between 0.17% and 2.0% by weight of carbon. In one embodiment, the carbon steel comprises between 0.12% and 0.18% by weight of carbon. In one embodiment, the carbon steel comprises between 0.12% and 0.15% by weight of carbon. In one embodiment, the carbon steel comprises 0.18% by weight of carbon.

Steel may be characterized by a four-digit number called the American Iron and Steel Institute (or AISI) number. When the first two digits of the AISI number are 10, the first two digits indicate that the material is a carbon steel. Other carbon steels have AISI numbers, wherein the first two digits of the AISI number are not 10. When the steel is a carbon steel, the second two digits of the AISI number refer to the hundredths of a percent by weight of carbon in the steel. For example, a carbon steel having an AISI number of 1018 is a carbon steel having about 0.18% of carbon by weight in its composition. In one embodiment of the invention, the carbon steel has an AISI number of 1018.

The addition of an aliphatic tertiary amino functional compound to a sulfur-based corrosion inhibitor, in a weight ratio of 1000:1 to 1:1000 of the sulfur-based corrosion inhibitor to the aliphatic tertiary amino functional compound, does not substantially affect the corrosion inhibition performance of the sulfur-based corrosion inhibitor. That is, the presence of the tertiary amino functional compound does not negatively impact the performance of the sulfur-based corrosion inhibitor but instead results in similar levels of corrosion inhibition to the sulfur-based corrosion inhibitor when the sulfur-based corrosion inhibitor is used alone to inhibit corrosion of a metal surface. However, since over time more of the sulfur-based corrosion inhibitor is present in a stabilized corrosion inhibitor composition compared to the amount of sulfur-based corrosion inhibitor in the same corrosion inhibitor composition but without the tertiary amino functional compound, the stabilized corrosion inhibitor composition is more effective, after a period of storage, than the same stabilized corrosion inhibitor without the tertiary amino functional compound. Such a period of storage is, in embodiments, about 1 day to 2 years, or about 5 days to 2 years, or about 7 days to 2 years, or about 15 days to 2 years, or about 30 days to 2 years, or about 60 days to 2 years, or about 90 days to 2 years, or about 180 days to 2 years, or about 1 year to 2 years. Such a period of storage also depends on storage conditions including temperature of storage.

Having described the invention in detail, it will be apparent that modifications and variations are possible without departing from the scope of the invention defined in the appended claims.

EXPERIMENTAL

Examples 1-3

Solutions of 10 wt % thioglycolic acid (TGA) with varying amounts of hexamethyltetramine (HMTA) in water were mixed as shown in Table 1; a control (C1) was also provided wherein no HMTA was added. Then 40 mL aliquots of each solution were added to 4 oz (118.3 mL) French square bottles, to provide a headspace of about 78 mL in each bottle. The bottles were then sealed and stored at 50° C. for 74 days. Then a GASTEC® tube (available from GASTEC Corporation of Midori-ku Yokohama, Japan) was used to analyze for $H_2S$ in the headspace of each bottle.

GASTEC® tubes are glass vials preloaded with a reagent that reacts with a specific chemical or family of chemicals. A calibrated 50 ml sample of headspace air is drawn through the tube with a bellows pump. If the targeted chemical(s) is present, the reagent in the tube changes color and the "length" of the color change in the tube indicates the measured concentration. The GASTEC® tubes employed in the Examples described herein are calibrated to determine hydrogen sulfide ($H_2S$) concentrations of up to 4000 ppm in an air sample. Results of the GASTEC® tube measurements taken after 74 days at 50° C. are set forth in Table 1.

TABLE 1

Concentration of $H_2S$ measured for the indicated solutions of Examples 1-3 and C1, wherein each solution includes 10 wt % thioglycolic acid and the solvent is water.

| Example No. | Wt % HMTA | $H_2S$, ppm |
|---|---|---|
| C1 | 0 | >4000 |
| 1 | 2.5 | 0 |
| 2 | 5 | 0 |
| 3 | 10 | 0 |

Examples 4-6

The procedure of Examples 1-3 was repeated, except using methanol as solvent instead of water. Solutions and results of $H_2S$ measurement are shown in Table 2.

TABLE 2

Concentration of $H_2S$ measured for the indicated solutions of Examples 4-6 and C2, wherein each solution includes 10 wt % thioglycolic acid and the solvent is methanol.

| Example No. | Wt % HMTA | $H_2S$, ppm |
|---|---|---|
| C2 | 0 | >4000 |
| 4 | 2.5 | 0 |
| 5 | 5 | 0 |
| 6 | 10 | 0 |

Examples 7-11

The procedure of Examples 1-3 was repeated, except instead of 10 wt % thioglycolic acid a corrosion inhibitor blend was employed, the corrosion inhibitor blend composed of 2.5 wt % thioglycolic acid, 0.1 wt % acetic acid, 6.4 wt % imidazoline salt, 5 wt % of a quaternary ammonium compound, and 86 wt % water. Concentration of HMTA and results of $H_2S$ measurement are shown in Table 3.

TABLE 3

Concentration of $H_2S$ measured for the indicated solutions of Examples 7-11 and C3.

| Example No. | Wt % HMTA | $H_2S$, ppm |
|---|---|---|
| C3 | 0 | 1800 |
| 7 | 0.5 | 0 |
| 8 | 1 | 0 |
| 9 | 2.5 | 0 |
| 10 | 5 | 0 |
| 11 | 10 | 0 |

Examples 12-13

The procedure of Examples 1-3 was repeated, except instead of 10 wt % thioglycolic acid a corrosion inhibitor blend composed of 9 wt % thioglycolic acid, 1 wt % of an oxyalkylate polymer, 20 wt % imidazoline, 4 wt % of a quaternary ammonium compound, 30 wt % 2-butoxyethanol, and 36 wt % water was employed. Concentrations of HMTA and results of $H_2S$ measurement are shown in Table 4.

TABLE 4

Concentration of $H_2S$ measured for the indicated solutions of Examples 12-13 and C4.

| Example No. | Wt % HMTA | $H_2S$, ppm |
|---|---|---|
| C4 | 0 | 1600 |
| 12 | 5 | 0 |
| 13 | 10 | 0 |

Example 14

Five, 40 g aliquots of 10% w/w 2-mercaptoethanol (2-ME) in water were combined with HMTA at 0 wt %, 0.5 wt %, 1 wt %, 2 wt %, and 5 wt % based on the total weight of the blend, and each aliquot was enclosed in a 4 oz French square bottle and stored in a temperature controlled cabinet at 50° C.

After 62 days storage at 50° C., headspace gas for each sample was measured using the technique of Examples 1-3. In the sample with 0 wt % HMTA, 600 ppm hydrogen sulfide was measured. In the four samples containing HMTA, no hydrogen sulfide was detected.

Example 15

Three, 40 g aliquots a commercial corrosion inhibitor concentrate containing about 15 wt % 2-mercaptoethanol in methanol along with other additives (Nalco EC1612A, available from Nalco Water of Naperville, Ill.) were combined with HMTA at 0 wt %, 0.5 wt %, and 0.95 wt % based on the total weight of the blend, and each aliquot was enclosed in a 4 oz French square bottle and stored in a temperature controlled cabinet at 50° C.

After 60 days storage at 50° C., headspace gas was measured using the technique of Example 14. In the sample with 0 wt % HMTA, 50 ppm hydrogen sulfide was measured. In the two samples containing HMTA, no hydrogen sulfide was detected.

Example 16

A solution of 2 wt % 2-mercaptoethanol in water was formed. A solution of 2 wt % 2-mercaptoethanol and 20 wt % HMTA in water was also formed. Then the corrosion inhibition performance of these two solutions was measured by injecting 10 ppm of each solution into separate corrosion bubble cell tests with a liter of brine to obtain 2 ppm 2-mercaptoethanol, and comparing corrosion rates of the two diluted blends.

The bubble cell tests were performed using the general procedure set forth in Andreev, N. et al., *J. Corros. Scale Inhib.* 2013, 2(1), 17-29. Conditions used were C1018 carbon steel electrode; 80° C.; $CO_2$ saturated 3% NaCl in water; continuous $CO_2$ sparge; and atmospheric pressure. The brine was first allowed to contact the C1018 carbon steel electrode for about 3hours before a 2-mercaptoethanol containing composition was added, and the test was started. A blank (no corrosion inhibitor and no HMTA) was also included for comparison.

Results are shown in FIG. 1. The corrosion rate of the brine with no corrosion inhibitor was reduced with the addition of 2 ppm 2-mercaptoethanol in the absence of HMTA. The corrosion rate of the brine was also reduced with the addition of 2 ppm 2-mercaptoethanol in the presence of HMTA. Within the error of the test, the same levels of corrosion inhibition are gained with a mixture of 2-mercaptoethanol and HMTA as with 2-mercaptoethanol alone.

What is claimed:

1. A stabilized corrosion inhibitor composition consisting of:
   about 5 wt % to 20 wt % of one or more sulfur-based corrosion inhibitors selected from mercaptoethanol and thioglycolic acid;
   hexamethylenetetramine in a weight ratio of 10:1 to 1:1 of the sulfur-based corrosion inhibitor to hexamethylenetetramine;
   optionally one or more equilibrium products of hexamethylenetetramine; and
   a solvent.

2. The stabilized corrosion inhibitor composition of claim 1 wherein the solvent comprises water or a water-miscible solvent.

3. The stabilized corrosion inhibitor composition of claim 1 wherein the equilibrium product of hexamethylenetetramine comprises formaldehyde and ammonia.

4. A substantially enclosed container comprising the stabilized corrosion inhibitor composition of claim 1.

5. The substantially enclosed container of claim 4, wherein the container comprises a temperature of about 0 ° C. to 60 ° C.

6. The substantially enclosed container of claim 4, wherein the container comprises the stabilized corrosion inhibitor composition for a period of about 1 day to 2 years.

7. A method of storing a sulfur-based corrosion inhibitor, the method comprising
   combining 5 wt % to 20 wt % of one or more sulfur-based corrosion inhibitors with hexamethylenetetramine to form a stabilized corrosion inhibitor composition, wherein the one or more sulfur-based corrosion inhibitors are selected from mercaptoethanol and thioglycolic acid, the weight ratio of the sulfur-based corrosion inhibitor to hexamethylenetetramine is about 10:1 to 1:1, and wherein the stabilized corrosion inhibitor composition consists of the one or more sulfur-based corrosion inhibitors, hexamethylenetetramine, optionally one or more equilibrium products of hexamethylene tetramine, and a solvent;

storing the stabilized corrosion inhibitor composition in a substantially enclosed container for about 1 day to 2 years wherein the temperature during the storing is between about 0° C. and 60° C., further wherein substantially no $H_2S$ is formed within the container during the storing.

8. The method of claim 7 further comprising applying the stabilized corrosion inhibitor composition to one or more water sources contacting a metal containment.

9. The method of claim 8 wherein the water source is produced water or recycled produced water.

10. The method of claim 8 wherein the metal containment comprises carbon steel.

11. The method of claim 7 wherein the concentration of the one or more sulfur-based corrosion inhibitors in the stabilized corrosion inhibitor composition is substantially the same before and after the storing.

12. The method of claim 7 further comprising opening and reclosing the container one or more times during the storing.

* * * * *